Feb. 9, 1926.

A. BROADMEYER

RULING APPARATUS

Original Filed Sept. 22, 1919   2 Sheets-Sheet 1

1,572,421

INVENTOR.
Albert Broadmeyer
BY
ATTORNEY.

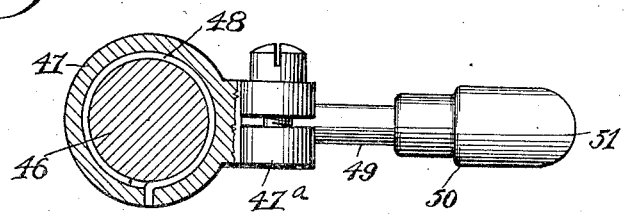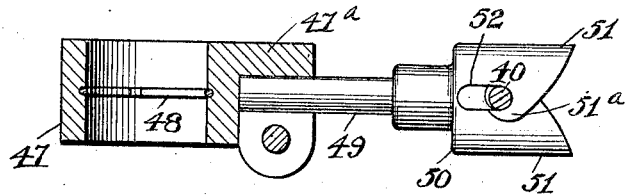

Patented Feb. 9, 1926.

1,572,421

UNITED STATES PATENT OFFICE.

ALBERT BROADMEYER, OF HARRISBURG, PENNSYLVANIA, ASSIGNOR TO W. O. HICKOK MANUFACTURING COMPANY, OF HARRISBURG, PENNSYLVANIA, A CORPORATION OF PENNSYLVANIA.

RULING APPARATUS.

Original application filed September 22, 1919, Serial No. 325,368. Divided and this application filed February 23, 1923. Serial No. 620,300.

*To all whom it may concern:*

Be it known that I, ALBERT BROADMEYER, a citizen of the United States, residing at Harrisburg, in the county of Dauphin and State of Pennsylvania, have invented certain new and useful Improvements in Ruling Apparatus, of which the following is a specification.

The present invention relates more particularly to the means for directing and guiding sheets of paper to the ruling mechanism, the object being to provide means of a novel and effective character, whereby the cords that cooperate with the conveyer sheet may be easily adjusted with respect to each other and with relation to the ruling pens.

The present application is a division of my co-pending application, Serial No. 325,368, filed September 22, 1919.

In the accompanying drawings:—

Figure 3 is a detail sectional view on an enlarged scale through one of the cord guides and its support, Figure 4 is a horizontal sectional view therethrough, Figure 5 is a plan view of one of the guides and its support, Figure 6 is an end elevation of one of the cord guide heads.

Figure 1:
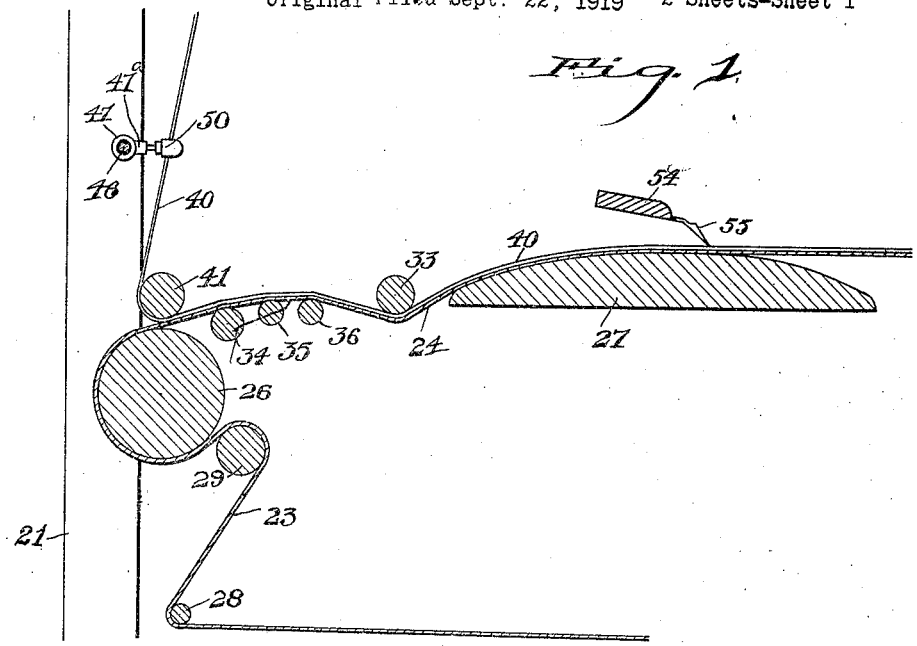
Figure 1 is a vertical sectional view and diagrammatic in its character of a portion of a ruling machine, showing the conveyer belt and holding cords with the guiding means for the latter.

In the embodiment disclosed a suitable frame is employed, including standards, one of which is illustrated at 21, and in this frame is located a work conveyer in the form of an endless belt 23, the upper stretch 24 of which extends longitudinally within the frame and constitutes a carrier for the sheets of paper to be ruled. This belt passes around a driving cylinder or roller 26, and the upper stretch 24 thereof operates over the upper convexed face of a stationary table 27. Suitable guiding rollers 28 are employed, and in order that the said belt may contact with a considerable portion of the cylinder or driving roller 26, a tension roller 29 engages it, adjacent to said roller. To insure the belt lying flat upon the table 27 and to hold the paper absolutely firm on the belt, a roller 33 is placed in advance of said table in a slightly lower plane than the front edge of the same. Other rollers 35 and 36 are interposed between the driving cylinder or roller 26 and the roller 33 to cause the portion of the belt between said rollers 26 and 33 to have a generally upwardly convexed path, causing a gradually increasing grip upon the paper sheets.

To hold the paper properly upon the upper stretch 24 of the conveyer belt, a plurality of endless cords 40 are employed, these cords passing at the front end of the machine around a roller 41 placed above the roller 26, thence passing under the roller 33 and lying flat upon and longitudinally of the upper stretch 24 of the belt.

To insure any desired locations for the cords individual guides are employed for each. The standards 21 support a horizontal rod 46 and on this rod are slidably mounted the said guides. Each guide consists of a collar 47 surrounding the rod and containing a friction spring 48 that snugly embraces and thus grips the rod sufficiently to hold the collar and guide at any point desired. These collars carry outstanding compressible clamps 47ª in which are detachably fitted stems 49. The stems are provided with terminal heads 50 in the form of two reversely disposed coacting hooks 51 that have inturned overlapping spaced bills, the hooks providing a guideway 52 between them, and the bills, forming a tortuous mouth 53 affording communication with the guideway.

It will be understood that the endless cords slidably pass through the guideways 52 and can be introduced or removed therefrom by reason of said mouths 53, yet when in place are held against accidental detachment. It will also be evident that the guides can be individually shifted along the supporting rod 46 to any points desired and the cords will be correspondingly positioned.

Figure 2:
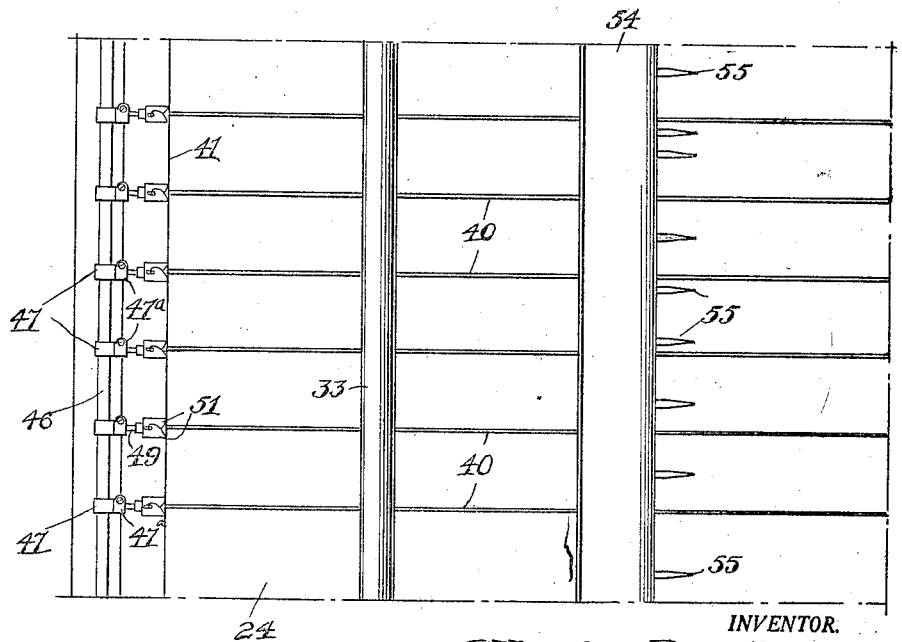
Figure 2 is a plan view of the same.

Mounted above the table 27 is shown a pen beam 54, which may be of any desired construction, and is provided with pens 55 adapted to operate in a well-known manner upon sheets carried by the upper stretch 24 of the conveyer belt 23, and held thereon by the cords 40. The positions of the pens 55 can be varied to suit the particular work being done and obviously the cords can also be adjusted so that they will not interfere with the pens, as indicated in Figure 2.

From the foregoing it is thought that the construction, operation and many advantages of the herein described invention will be apparent to those skilled in the art, without further description, and it will be understood that various changes in the size, shape, proportion and minor details of construction, may be resorted to without departing from the spirit or sacrificing any of the advantages of the invention.

Having thus fully described my invention, what I claim as new, and desire to secure by Letters Patent, is:—

1. In a ruling machine, a movable endless work-holding cord, and an adjustably supported guide for the cord having an eye through which the cord passes.

2. In a ruling machine, having a movable endless work-holding cord, a supporting rod, and a guide for said cord, said guide having an adjustable mounting on the rod and having a member that yieldingly bears against the rod to frictionally hold the guide in different positions.

3. In a ruling machine having a movable endless work-holding cord, a supporting rod, a guide for said cord having a collar slidable on the rod, and a friction spring carried by the collar and frictionally engaging the rod to normally hold said collar against movement on the rod.

4. In a ruling machine having a plurality of movable endless work-holding elements, an independent guide for each of said elements, said guide having an eye through which the element passes, a support on which the guides are slidably mounted, and springs embracing and frictionally engaging the support for holding the guides in different positions on the support.

5. In a ruling machine having a plurality of work-holding cords, a supporting rod disposed transversely of the said cords, collars slidable on the rod and having internal springs for frictionally engaging the rod to hold the collars in different positions on the rod, and guide eyes carried by the collars and through which said cords are adapted to pass.

6. In a ruling machine having a movable work-holding cord, the combination with a supporting rod, of a collar adjustable along the same, and a stem slidably mounted in the collar and having a head provided with a guideway through which said cord is adapted to pass.

7. In a ruling machine having a movable work-holding cord, the combination with a supporting rod, of a collar adjustable along the same and having a contractile clamp, and a stem held by the clamp and having a head provided with reversely disposed hooks forming a guideway through which said cord is adapted to pass.

In testimony whereof, I affix my signature.

ALBERT BROADMEYER.